3,590,012
PROCESS FOR THE PRODUCTION OF CELLULAR POLYURETHANE PLASTIC MOLDING HAVING A COMPACT SURFACE

Gunter Hauptmann, Leverkusen, Germany, Heinz Wolfgang Patzelt, Carnegie, Pa., and Hermann Schafer, Opladen, and Hans Wirtz, Leverkusen, Germany, assignors to Farbenfabriken Bayer Aktiengesellshaft, Leverkusen, Germany
No Drawing. Filed May 5, 1969, Ser. No. 821,992
Claims priority, application Germany, May 7, 1968,
P 17 69 313.9
Int. Cl. C08g 22/44
U.S. Cl. 260—2.5                                    6 Claims

ABSTRACT OF THE DISCLOSURE

Cellular polyurethanes having a compact integral skin are prepared using as the blowing agent mixtures of halogenated hydrocarbons and hydrates of organic compounds that split off the water of hydration at temperatures above 40° C.

---

This invention relates to cellular polyurethane moldings and to a method of producing the same. More particularly, it relates to cellular polyurethanes having a well developed firm skin.

The production of polyurethane foam moldings by foaming in a mold is known in principle (see, for example, German patent specification 851,851). This is carried out, for example, by introducing into a mold a foamable mixture which is a mixture of compounds which have several reactive hydrogen atoms with polyisocyanates. Suitable compounds which have reactive hydrogen atoms are, in particular, polyethers and polyesters which contain hydroxyl groups, and examples of suitable polyisocyanates are 2,4- and 2,6-toluylene diisocyanates, their isomeric mixtures and polyphenylpolymethylenepolyisocyanate which is obtained by aniline formaldehyde condensation followed by phosgenation of the product. The blowing agents used may, for example, be water and/or halogenated hydrocarbons. Catalysts such as those which are known for the production of polyurethane foams are usually also used.

The moldings which are obtained by foaming in a mold may have a compact surface which often is of high strength. It is known that the strength of the noncellular skin which forms during the foaming can be influenced by varying the compounds which have reactive hydrogen atoms, by suitable use of catalysts and by varying the molding temperature and the degree of compression (see German Auslegeschrift 1,196,864).

The nature of the blowing agent used also has an important effect on the strength of the skin of the foam. Although carbon dioxide which is formed by the reaction of isocyanates with water is basically suitable for use as a blowing agent and produces a foam which has good mechanical properties, the skin of the moldings is usually very thin and frequently permeated with cells. It has been found by experience that it is therefore desirable to use low boiling solvents, such as trichloromonofluoromethane, as blowing agents if it is desired to obtain a particularly well developed noncellular skin. However, the presence of even small quantities of water produce a skin which is permeated with fine cells, especially where the liquid reaction mixture comes in contact with the mold. Hence, the absence of water is usually necessary when producing moldings having a perfect skin. The complete exclusion of moisture, e.g. using orthoformic acid esters or zeolite, is, however, difficult to achieve. Moreover, the bond between the skin of the foam and the cellular core is usually not satisfactory if blowing agent, such as halogenated hydrocarbons, are used exclusively. Another disadvantage is that moldings which have been produced with no water present have a tendency to shrink, which is especially marked when the moldings have been produced in metal molds.

It is therefore an object of this invention to provide cellular polyurethane moldings having a well developed and firm skin. It is another object of this invention to provide cellular polyurethane moldings having a clearly defined skin firmly connected to the cellular core. It is a further object of this invention to provide a method of producing cellular polyurethane moldings having a well developed firm skin firmly connected to the cellular core.

The foregoing objects and others which will become apparent from the following description are accomplished in accordance with this invention, generally speaking, by providing cellular polyurethane moldings having a well developed firm skin by reacting an organic compound containing active hydrogen atoms and a molecular weight of at least 500 and an organic polyisocyanate in the presence of a blowing agent including a halogenated hydrocarbon and a hydrate of an organic compound that splits off the water of hydration at temperatures above 40° C., wherein 4 to 6 parts by weight of halogenated hydrocarbon are used per part by weight of the hydrate of the organic compound. The polyurethane foams thus produced have a compact, i.e. noncellular, surface by foaming in a mold a foamable reaction mixture which is based on compounds which have reactive hydrogen atoms, blowing agents and polyisocyanates, the blowing agents being mixtures of halogenated hydrocarbons and hydrates of organic compounds which split off the water of hydration at temperatures above 40° C. The starting materials used in the process according to the invention are in general any higher molecular weight polyalkylene glycol ethers, e.g. those which have molecular weights between 500 and 10,000, preferably between 1,000 and 5,000, e.g. linear polyalkylene glycol ethers which have been obtained by polymerization of alkylene oxides such as ethylene oxide, propylene oxide, butylene oxide or tetrahydrofuran. Copolymers may also, of course, be used. The properties of the end products are often remarkably modified by the use of copolymers. Linear or branched addition products obtained by the addition of the above alkylene oxides to polyfunctional alcohols, amino alcohols or amines, for example, can also be used. Ethylene glycol, 1,2-propylene glycol, trimethylolpropane, butane-1,4-diol, glycerol, hexane-1,2,6-triol, ethanolamine, diethanolamine, triethanolamine and alkylene diamines of the ethylene diamine type are given as examples of polyfunctional starting components to which the alkylene oxides may be added. Mixtures of different types of linear or branched alkylene glycol ethers may, of course, also be used. Often compounds of the type already given, which have different reactivities towards isocyanates are added. It is preferred to add short chained cross-linking agents such as di- and tri-ethylene glycol, 1,2-propylene glycol, 1,3-propylene glycol, 1,4-butylene glycol, trimethylolpropane, glycerol, hexane-1,2,6-triol, diethanolamine or triethanolamine. Mixtures of these components may also be added. Hydroxyl polyesters, e.g. those based on polybasic carboxylic acids, such as oxalic acid, succinic acid, glutaric acid, adipic acid, sebacic acid, phthalic acid, terephthalic acid, benzene tricarboxylic acids and the like and polyhydric alcohols such as ethylene glycol, butane-1,4-diol, hexane-1,6-diol, hexane-1,2,6-triol, glycerol, trimethylolpropane and the like; or polyesters based on lactones, such as ε-caprolactone, may also be used.

In principle, any polyisocyanates may be used. The following are given as examples: hexamethylene-1,6-diisocyanate, methylcyclohexane-2,4- and -2,6-diisocyanates and any mixtures of these isomers, dicyclohexylmethane-4,4'-diisocyanate, m- and p-xylylene diisocyanates, 2,4- and 2,6-toluylene diisocyanates and any mixtures of these isomers, diphenylmethane-4,4'-diisocyanate and polyisocyanates which contain isocyanurate groups.

The preferred polyisocyanate is a carbodiimide modified diphenylmethane-4,4'-diisocyanate which is prepared according to U.S. patent specification 3,152,162.

The polyphenyl-polymethylene-polyisocyanate prepared by aniline formaldehyde condensation followed by phosgenation is also particularly suitable. A mixture of diphenylmethane-4,4'- diisocyanate and toluene-2,4- or -2,6-diisocyanates also yields products which have good mechanical properties.

Another preferred polyisocyanate which can be used in the process according to the invention is an adduct containing free isocyanate groups which is prepared, e.g. by reacting polyols, such as, those set forth above, with diphenylmethane-4,4'-diisocyanate or toluylene-2,4- or -2,6-diisocyanate or isomeric mixtures thereof.

It is essential to use as blowing agents mixtures of halogenated hydrocarbons with hydrates of organic compounds which split off the water of hydration at temperatures above 40° C. Suitable halogenated hydrocarbons for use in the process of this invention are the compounds normally used for the production of polyurethane foams, e.g. trichlorofluoromethane, dichlorodifluoromethane, chlorofluoroethane or methylene chloride. Suitable hydrates of organic compounds which split off the water of hydration at temperatures above 40° C. are, for example, ethylene glycol hydrate and chloral hydrate.

Those hydrates of ethylene glycol of the formulae $C_2H_6O_2 \cdot 2H_2O$ and $3C_2H_6O_2 \cdot 2H_2O$ are very advantageous.

The process according to the invention is normally carried out in the presence of catalysts; the use of tertiary amines such as triethylene diamine or dimethylbenzylamine is preferred. However, organometallic compounds such as stannous octoate or dibutyltin dilaurate may also be used, if desired mixed with the amine catalysts.

Additives such as dyes, pigments, fillers and flame-protective agents may also be included in the process according to the invention.

The invention is further illustrated but is not intended to be limited by the following examples in which all parts and percentages are by weight unless otherwise specified.

EXAMPLE 1

About 90 parts of an adduct of propylene oxide and ethylene oxide with trimethylolpropane (OH number 37), about 6 parts of butane-1 4-diol, about 3 parts of ethylene glycol hydrate $3C_2H_6O_2 \cdot 2H_2O$, about 12 parts of trichloromonofluoromethane and about 0.5 part of triethylenediamine are mixed together and reacted with 37 parts of a diphenylmethane diisocyanate which modified with carbodiimide according to the process of German patent specification 1,092,007.

A foam which has the following mechanical properties is obtained:

Bulk density according to DIN 53,420—70 kg./m.$^3$
Tensile strength according to DIN 53,571—1.3 kg. wt./cm.$^2$
Elongation at break according to DIN 53,571—180%
Compression strength at 40% compression according to DIN 53,577—50 p./cm.$^2$ The same reaction as above is conducted and foaming is carried out in a closed mold under a degree of compression (the ratio of bulk density when freely foamed to bulk density when foamed in the mold) of about 1:5. A molding having a cellular core and a compact, non-cellular skin of about 1 to 2 mm. thickness is obtained.

EXAMPLE 2

About 90 parts of an adduct of propylene oxide and ethylene oxide with propylene glycol (OH number 27), about 0.8 part of butane-1,4-diol, about 1 part of ethylene glycol hydrate $3C_2H_6O_2 \cdot 2H_2O$, about 6 parts of trichloromonofluoromethane, about 2 parts of dichloromethane and about 0.7 part of triethylene diamine are mixed together and reacted with about 48 parts of an adduct of tripropylene glycol and diphenylmethane-4,4'-diisocyanate, NCO content 23.7 percent. A tough foam having the following mechanical properties is obtained:

Bulk density according to DIN 53,420—225 kg./m.$^3$
Tensile strength according to DIN 53,571—4 kg. wt./cm.$^2$
Elongation at break according to DIN 53,571—380%
Compression resistance at 40% compression according to DIN 53,577—190 p./cm.$^2$ The same reaction as above is conducted and foamed under compression in a mold. A molding having a cellular core and a very tough skin of thickness 4 to 5 mm. is obtained.

EXAMPLE 3

About 90 parts of an adduct of propylene oxide and ethylene oxide with trimethylolpropane (OH number 37), about 8 parts of butane-1,4-diol, about 2 parts of chloral hydrate, about 8 parts of trichloromonofluoromethane, about 1 part of black pigment (lampblack) and about 0.7 part of triethylene diamine are mixed together and reacted with about 34 parts of a polyphenylpolymethylene polyisocyanate (NCO content 32%). Foaming is carried out in a closed mold under a compression ratio of 1:3 to 1:5. A molding having a cellular core and a compact, non-cellular skin of about 1 to 2 mm. in thickness is obtained.

The 2 parts of chloral hydrate in the above recipe are replaced by about 0.2 part of $H_2O$. The skin in the molding produced is found to be strongly permeated with cells, especially in the region where the liquid reaction mixture lies, and is therefore lighter in color.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. In the process of preparing cellular polyurethane plastics having an integral skin by reaction of an organic polyisocyanate with an organic compound selected from the group consisting of polyhydroxy polyethers and polyhydroxypolyesters and having a molecular weight of at least 500 in a mold and in the presence of a blowing agent the improvement which comprises incorporating in the reaction mixture as the blowing agent, a mixture of from 4 to 6 parts by weight of a halogenated hydrocarbon per part by weight of a hydrate of an organic compound that splits off the water of hydration at a temperature above 40° C. which is selected from the group consisting of an ethylene glycol hydrate and chloral hydrate.

2. The process of claim 1, wherein the ethylene glycol hydrate is $C_2H_6O_2 \cdot 2H_2O$ or $3C_2H_6O_2 \cdot 2H_2O$.

3. The process of claim 1, wherein the organic polyisocyanate is a carbodiimide modified diphenylmethane-4,4'-diisocyanate.

4. The process of claim 1, wherein the organic polyisocyanate is a prepolymer having free isocyanate groups which have been obtained by reacting polyols with diphenylmethane - 4,4' - diisocyanate, toluylene-2,4-diisocyanate or toluylene-2,6-diisocyanates.

5. The process of claim 1, wherein the organic polyisocyanate is a polyphenylpolymethylene polyisocyanate mixture prepared by anilineformaldehyde condensation followed by phosgenation.

6. The process of claim 1 wherein the organic compound having active hydrogenation is a polyalkylene ether glycol.

References Cited

UNITED STATES PATENTS

| 2,779,689 | 1/1957 | Reis | 117—104 |
|---|---|---|---|
| 2,895,926 | 7/1959 | Rappaport et al. | 260—2.5 |
| 3,182,104 | 5/1965 | Cwik | 264—45 |

FOREIGN PATENTS

| 1,120,425 | 7/1968 | Great Britain | 260—2.5 |
|---|---|---|---|
| 1,160,042 | 7/1969 | Great Britain | 260—2.5 |
| 1,433,673 | 2/1966 | France | 260—2.5 |
| 1,499,903 | 9/1967 | France. | |

M. J. WELSH, Primary Examiner

D. J. BARRACK, Assistant Examiner

U.S. Cl. X.R.

264—54